(12) United States Patent
Hiraiwa

(10) Patent No.: US 7,753,185 B2
(45) Date of Patent: Jul. 13, 2010

(54) SHIFT DEVICE WITH SYNCHRONIZER ADAPTED FOR TRANSMISSION

(75) Inventor: Kazuyoshi Hiraiwa, Yokohama (JP)

(73) Assignee: Kyowa Metal Works Co., Ltd, Kanazawa-Ku (JP)

( * ) Notice: Subject to any disclaimer, the term of this patent is extended or adjusted under 35 U.S.C. 154(b) by 745 days.

(21) Appl. No.: 11/498,148

(22) Filed: Aug. 3, 2006

(65) Prior Publication Data
US 2007/0029155 A1 Feb. 8, 2007

(30) Foreign Application Priority Data
Aug. 5, 2005 (JP) ............................. 2005-227450

(51) Int. Cl.
*F16D 23/06* (2006.01)
(52) U.S. Cl. ................... 192/53.31; 192/53.343
(58) Field of Classification Search ............ 192/53.31, 192/54.341, 53.343
See application file for complete search history.

(56) References Cited
U.S. PATENT DOCUMENTS

| 2,410,511 | A | | 11/1946 | Letsinger et al. | |
|---|---|---|---|---|---|
| 3,578,784 | A | * | 5/1971 | Ashauer et al. | 192/53.343 |
| 4,573,371 | A | * | 3/1986 | Akutagawa | 74/339 |
| 4,869,353 | A | * | 9/1989 | Ohtsuki et al. | 192/53.31 |
| 2004/0154892 | A1 | * | 8/2004 | Coxon et al. | 192/53.31 |
| 2006/0011440 | A1 | * | 1/2006 | Giese et al. | 192/53.341 |
| 2007/0199786 | A1 | * | 8/2007 | Hiraiwa | 192/53.34 |

FOREIGN PATENT DOCUMENTS

EP  0 743 466 A1  11/1996

* cited by examiner

*Primary Examiner*—Rodney H Bonck
(74) *Attorney, Agent, or Firm*—Wenderoth, Lind & Ponack L.L.P.

(57) ABSTRACT

A shift device includes a hub, a sleeve splined with the hub, and a pair of speed gears sandwiching the hub. Thrust pieces are respectively inserted in the concave portions of the sleeve and movable in the notches of the hub in an axial direction, and formed with slanted surfaces on their outer circumference for contacting with slanted surfaces of the sleeve, and contact with projections of synchronizer rings so that the thrust pieces can move around the projections and push the projections in the axial direction. The thrust pieces are also formed with projecting portions at their four edges, seen from an outside of the hub in a radial direction, the projecting portions being formed with slanted surfaces corresponding to the slanted surfaces of the hub.

19 Claims, 10 Drawing Sheets

SHIFT DEVICE WITH SYNCHRONIZER ADAPTED FOR TRANSMISSION

BACKGROUND OF THE INVENTION

1. Field of the Invention

The present invention relates to a shift device with a synchronizer adapted for a transmission in which a pushing force applied to a sleeve can be amplified into a large pushing force acting on a synchronizer ring while gears of the transmission are shifted, thereby reducing the effort required by a driver or an actuator.

2. Description of the Related Art

A conventional shift device with a synchronizer adapted for a transmission is disclosed in U.S. Pat. No. 2,410,511. This conventional shift device includes a hub with a slanted surface and a synchronizer ring with a slanted surface, where the slanted surfaces change a part of the friction torque caused between the synchronizer ring and the hub into thrust acting on the synchronizer ring, thereby increasing synchronizing ability.

This shift device has a disadvantage in that a drag friction force is promoted between the synchronizer ring and a gear even when the sleeve is positioned at a neutral position, and not engaging with splines of the gear, because the slanted surfaces of the hub and the synchronizer ring are always contactable with each other, even at the neutral position to generate and promote thrust that pushes the synchronizer ring toward the gear.

The increase in the drag friction torque degenerates the fuel consumption of an engine, and additionally produces an increase in the oil temperature of a transmission.

In order to avoid such a problem, a shift device disclosed in EP 0 743 466 is constructed to always apply pullback force to the synchronizer so that it can move off from the gear.

This conventional shift device with the synchronizer, however, encounters a problem in that it requires a lot of parts and its assembly becomes complex, thereby increasing its manufacturing costs.

SUMMARY OF THE INVENTION

It is, therefore, an object of the present invention to provide a shift device with a synchronizer for a transmission which overcomes the foregoing drawbacks and can amplify pushing force applied to a sleeve, and avoid increase in drag friction torque generated between the sleeve and a hub in a state where no synchronization is performed, with less parts and easy assembly of the parts.

According to a first aspect of the present invention there is provided a shift device with a synchronizer for a transmission which includes a shaft for transmitting drive power, a hub having a boss portion splined with the shaft, a ring portion located outwardly from the boss portion and formed with splines, and a flange portion connecting the boss portion and the ring portion, the ring portion and the flange portion being formed with a plurality of notches having axial four edges, the four edges being respectively provided with slanted surfaces for changing rotational force to thrust, a sleeve provided with splines on an inner peripheral portion thereof and formed with a plurality of concave portions having slanted surfaces on a part of the splines of the sleeve, the sleeve being supported by and slidable along the splines of the hub, a pair of speed gears arranged to sandwich the hub and having splines engageable with the splines of the sleeve and a friction surface at a hub side, a pair of synchronizer rings respectively arranged between the hub and the speed gears, and having a friction surface, splines and projections, the friction surface being pressable on the friction surface of the speed gears, and the splines being formed with chamfers on an outer circumference thereof, and thrust pieces respectively inserted in the concave portions of the sleeve and movable in the notches of the hub in an axial direction. The thrust pieces are formed at an outer circumferential surface thereof with slanted surfaces for contacting with the slanted surfaces of the sleeve, so that the sleeve can push the thrust pieces in the axial direction, the thrust pieces being pushed outwardly in a radial direction so that the sleeve can move together with the thrust pieces in an axial direction, and then move relative to the thrust pieces in the axial direction, pressing the thrust pieces inwardly in the radial direction, when the sleeve is shifted from a neutral position toward one of the speed gears, wherein the thrust pieces are capable of contacting with the projections of the synchronizer rings in a rotational direction so that the thrust pieces push the projections of the synchronizer rings in the axial direction. The thrust pieces are also formed with projecting portions at four edges thereof, seen from an outside of the hub in the radial direction, the projecting portions of the thrust pieces being formed with slanted surfaces corresponding to the slanted surfaces of the hub so that the slated surfaces of the thrust pieces are apart from the slanted surfaces of the hub when the sleeve is located at the neutral position, wherein the slanted surfaces of the thrust pieces and the hub are configured to contact each other by the thrust pieces moving when the sleeve is shifted from the neutral position to one of the speed gears in the pair of speed gears to be engaged and a difference torque between the friction surfaces between the respective synchronizer and one of the speed gears in the pair of speed gears to be engaged is generated, and wherein the thrust pieces are moved such that the slanted surfaces of the thrust pieces are apart from the slanted surfaces of the hub, by the projections of the respective synchronizer ring that is pushed back when the difference torque becomes zero.

Preferably, the thrust pieces are formed like a capital letter "H", seen from an outside of the hub in a radial direction, and formed with cut-off portions in the letter "H" contacting with the projections of the synchronizer rings.

Preferably, the slanted surfaces of the thrust pieces are apart from the slanted surfaces of the hub when the sleeve is located at a neutral position, and are capable of contacting only with the slanted surface of the hub at the speed gear to be engaged when the sleeve is moved toward the speed gear.

Preferably, the thrust pieces are pushed outwardly in the radial direction by a spring.

Preferably, the thrust pieces have projections contactable with walls of circumferential grooves formed on concave portions of the sleeve.

BRIEF DESCRIPTION OF THE DRAWINGS

The objects, features and advantages of the present invention will become apparent as the description proceeds when taken in conjunction with the accompanying drawings, in which.

DETAILED DESCRIPTION OF THE INVENTION

Figure 1:
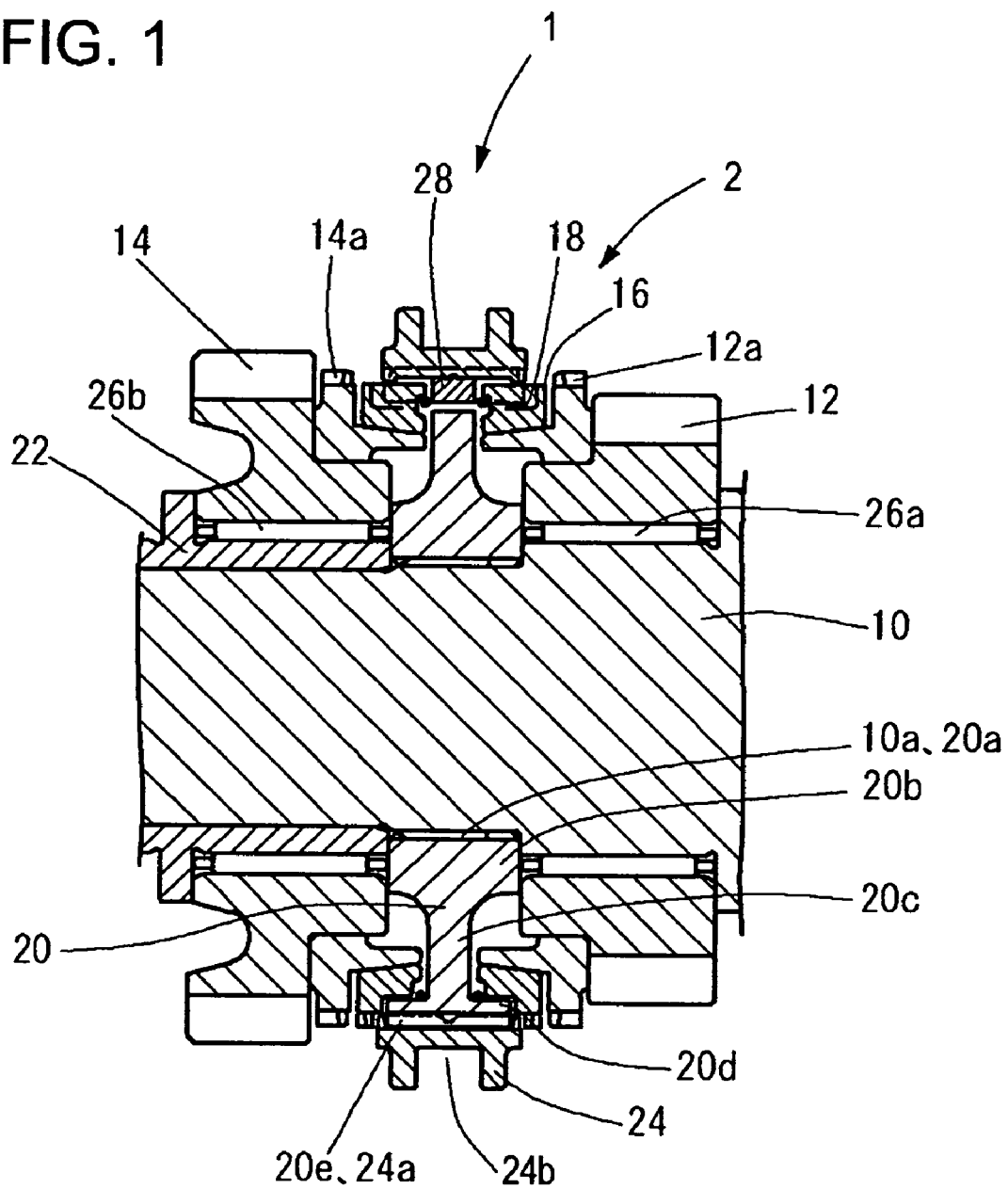
FIG. 1 is a cross-sectional plan view showing a shift device with a synchronizer of a first embodiment according to the present invention, taken along the line I-0-I in FIG. 2.

Throughout the following detailed description, similar reference characters and numbers refer to similar elements in all figures of the drawings, and their descriptions are omitted to eliminate duplication.

Figure 2:
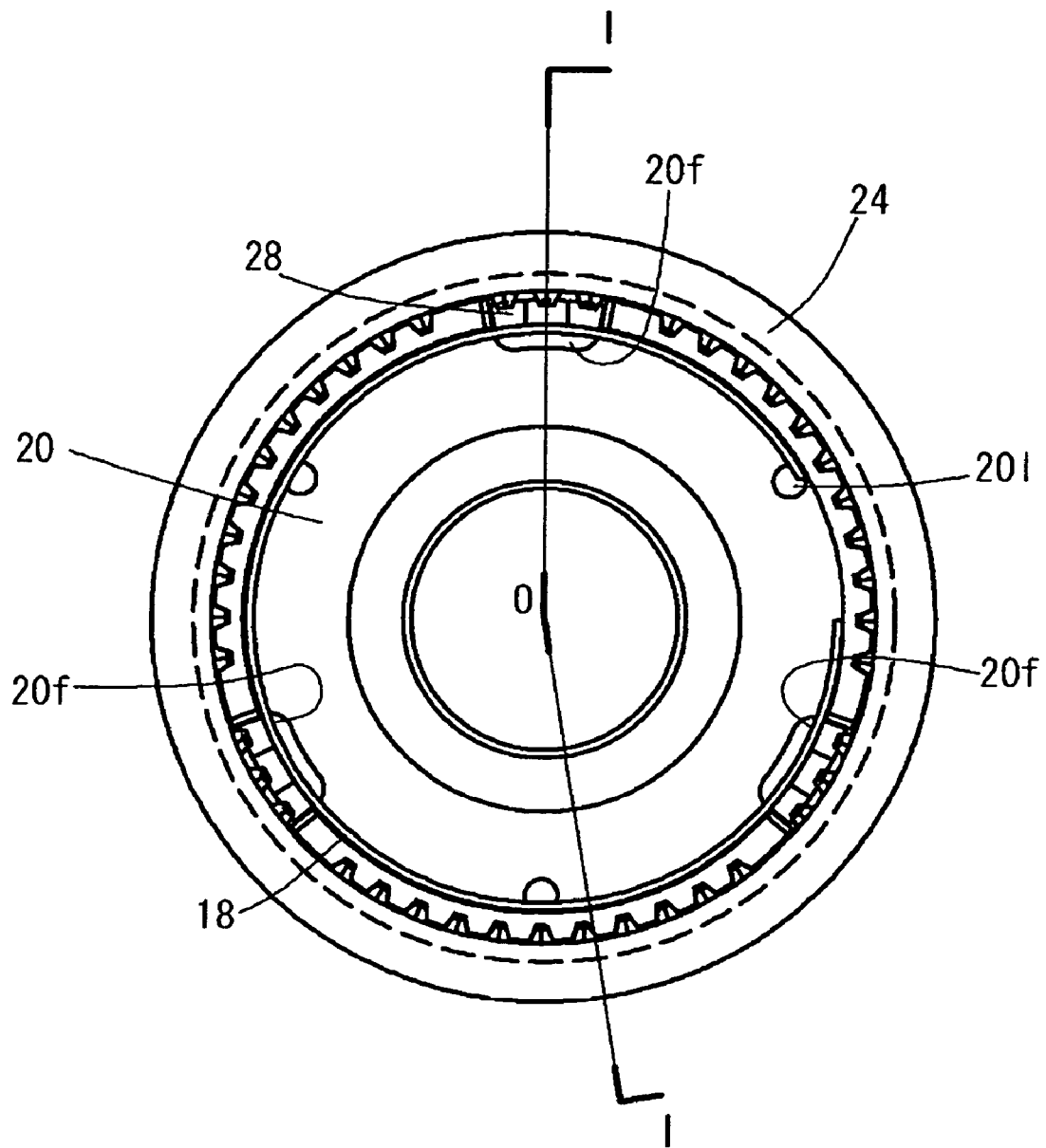
FIG. 2 is a front view showing a hub, a sleeve, and three thrust pieces pushed by a spring outwardly in a radial direction, which are used in the shift device of the embodiment shown in FIG. 1.
Figure 3:
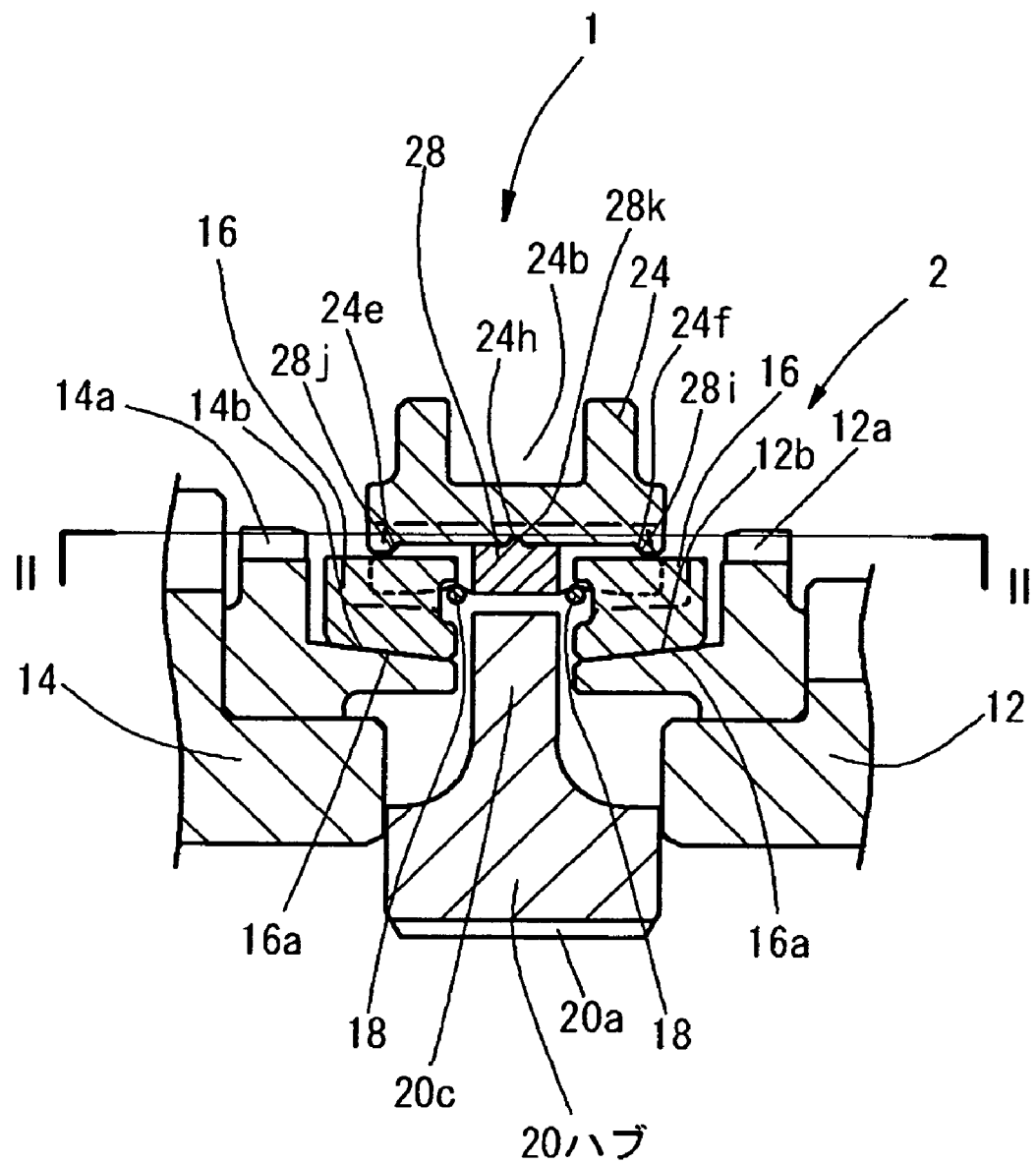
FIG. 3 is an enlarged cross-sectional plan view showing a main part of the shift device shown in FIG. 1.

Referring to FIGS. 1 to 3 of the drawings, there is shown a shift device with a synchronizer adapted for a transmission of a first preferred embodiment according to the present invention.

The shift device 1 includes an input shaft 10 connectable with a crank shaft (not shown) of an engine via a clutch (not shown), a third gear 12, a fourth gear 14, and a synchronizer 2 placed between the third gear 12 and the fourth gear 14. The input shaft 10 is capable of transmitting drive power and acts as a shaft of the present invention. The third gear 12 and the fourth gear 14 act as a pair of speed gears of the present invention.

The input shaft 10 is formed on its partial outer surface with splines 10a, which are engaged with splines 20a formed on an inner surface of cylindrical boss portion 20b of the hub 20, so that the input shaft 10 drives the hub 20 to rotate together with each other at the same speed. The hub 20 is fixed to the input shaft 10 by contacting at its one side portion with a large diameter portion of the input shaft 10 and also contacting at its other end portion with a bush 22, which is press-fitted onto an outer surface of a small diameter portion of the input shaft 10.

The hub 20 has the boss portion 20b, a ring portion 20d arranged in coaxial with the boss portion 20b and outwardly in its radial direction, and a flange portion 20c connecting the boss portion 20b and the ring portion 20d and formed thinner in thickness than the boss portion 20b. Splines 20e are formed on the outer surface of the ring portion 20d, and they engage splines 24a formed on an inner surface of a sleeve 24 so as to slide relative to each other in the axial direction.

The sleeve 24 is formed on its outer surface with a circumferential groove 24b on its outer surface, in which a shift fork (not shown) is partially inserted. The shift fork is capable of moving in the axial direction according to the movement of a shift lever (not shown) operated by a driver or an actuator (not shown).

On the input shaft 10, the third gear 12 is freely rotatably supported through a bearing 26a at one side of the hub 20, and the fourth gear 14 is freely rotatably supported though a bearing 26b at the other side of the hub 20. The third gear 12 and the fourth gear 14 are in constant mesh with gears (not shown) on an output shaft arranged in parallel to the input shaft 10, respectively.

The third gear 12 is formed to integrally have splines 12a and an outer conical friction surface 12b at the hub 20 side thereof. The splines 12a are capable of engaging with the spline 24a of the sleeve 24 by moving the sleeve 24 to a third speed position. The outer conical friction surface 12 faces to an inner conical friction surface 16a of a synchronizer ring 16. The inner conical friction surface 16a corresponds to a friction surface of the present invention.

Similarly, the fourth gear 14 is formed to integrally have splines 14a and an outer conical friction surface 14b at the hub 20 side thereof. The splines 14a are capable of engaging the splines 24a of the sleeve 24 by moving the sleeve 24 to a fourth speed position. The outer conical friction surface 12b faces to an inner conical friction surface 16a of another synchronizer ring 16, which is arranged symmetrically with the synchronizer ring 16 at the third gear 12 side, so that the conical friction surfaces 12b and 16a are arranged in symmetry with each other with respect to the hub 20 in the axial direction. The inner conical friction surface 16a corresponds to a friction surface of the present invention.

The sleeve 24 is designed to have lengths and positional relationships with other parts so as to move and to be shiftable among the third speed position, the fourth speed position, and a neutral position, positioned between the third and fourth speed positions as shown in FIG. 1, where the splines 24a of the sleeve 24 are not in mesh with the splines 12a and 14a of the third and fourth gears 12 and 14. Note that the splines 24a of the sleeve 24 is in constant mesh with the splines 20e of the ring portion 20d at the third speed, neutral, and fourth speed positions.

The synchronizer ring 16, the sleeve 24 and the splines 12a and 14a and the outer friction surfaces 12 b and 14b of the third and fourth gears 12 and 14 constitute the synchronizer 2 of the shift device 1.

The above-constructed synchronizer 2 of the embodiment further has a force amplifying mechanism, which is constructed as discussed below.

Figure 4:
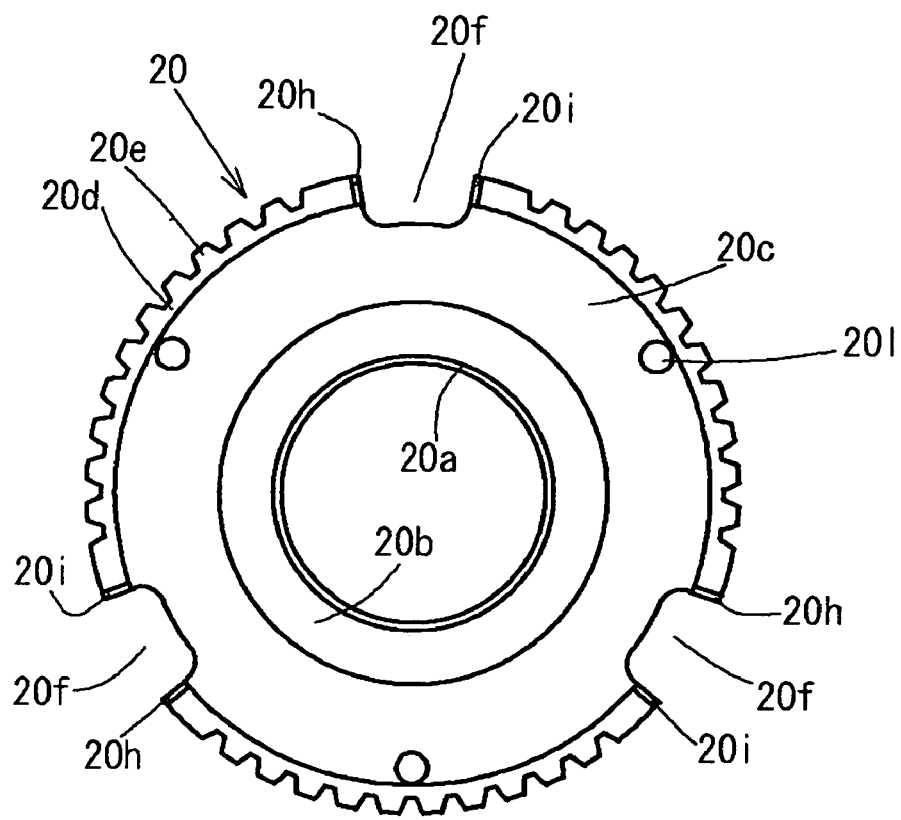
FIG. 4 is a front view showing the hub of the shift device shown in FIG. 1.

A shown in FIG. 4, the flange portion 20c and the ring portion 20d of the hub 20 are partially cut off at three portions to form three notches 20f, in each of which a thrust piece 28 is located as shown in FIGS. 1 to 3. The thrust pieces 28 are also located between the synchronizer rings 16 and 16 in the axial direction, and between the hub 20 and the sleeve 24 in the radial direction. The thrust pieces 28 are pushed outwardly by two springs 18, which are arranged in an inner space formed by the three thrust pieces 28.

Figure 5:
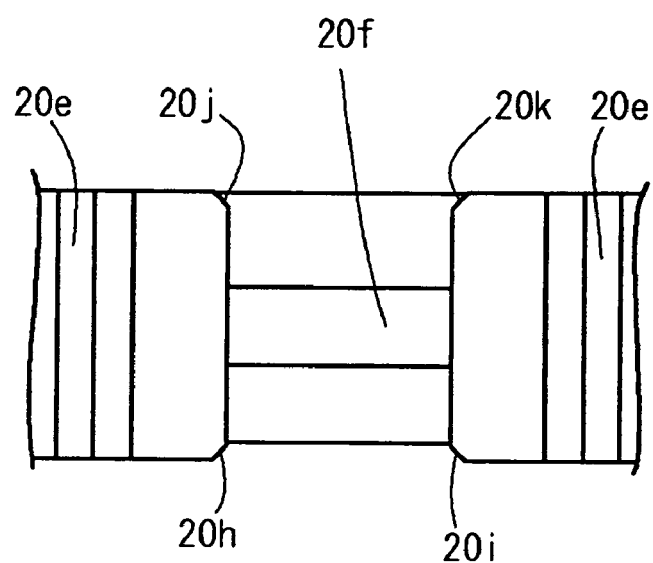
FIG. 5 is an enlarged fragmentary view showing an outer peripheral part of the hub shown in FIG. 4, seen from the outside of the hub in the radial direction.

The notches 20f of the hub 20 are formed at four edges in the axial direction to have slanted surfaces 20h to 20k as shown in FIGS. 4 and 5. These slanted surfaces 20h to 20k are designed to have a configuration to change directions of forces so that the thrust pieces 28 are pushed in the direction when the thrust pieces 28 contact with the slanted surfaces 20h to 20k of the hub 20 and rotating force applies.

As shown in FIG. 4, the hub 20 is provided with three holes 20l, extending in the axial direction, in which end portions of the springs 18 are fixed.

Figure 6:
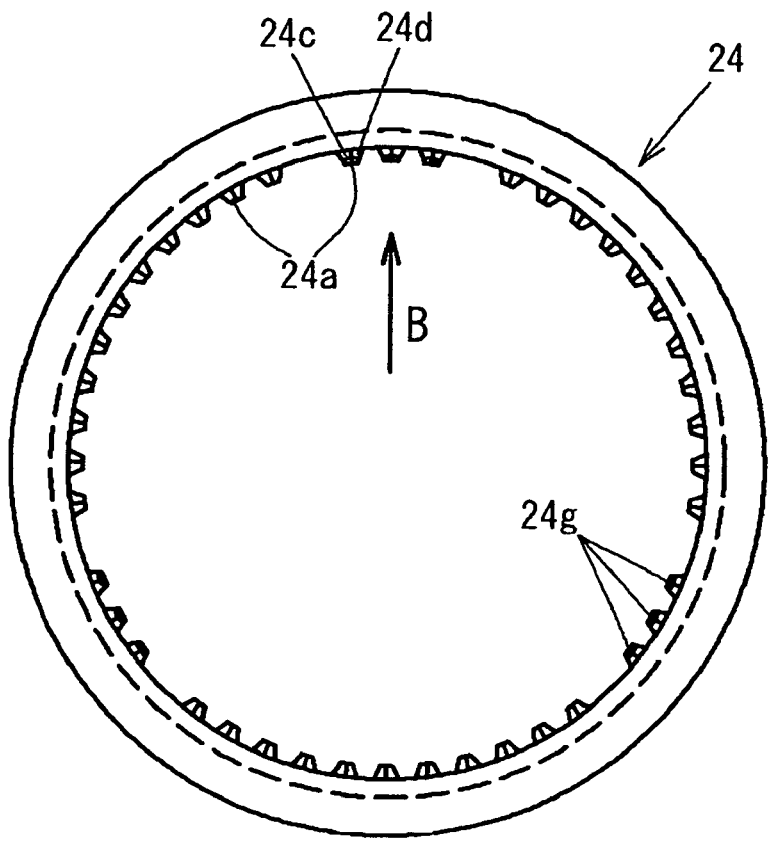
FIG. 6 is a front view showing the sleeve used in the select device shown in FIG. 1.
Figure 7:
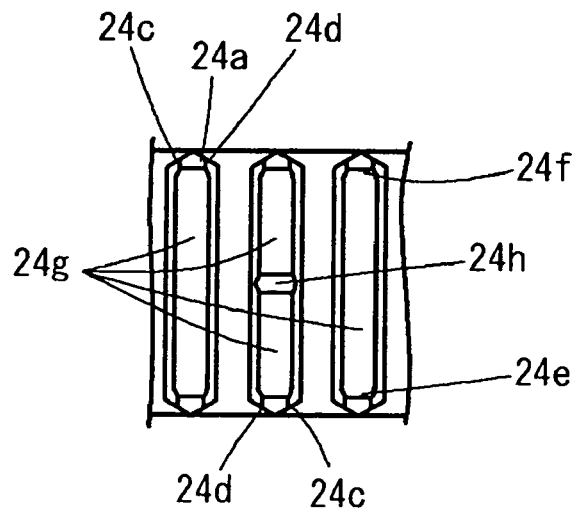
FIG. 7 is an enlarged fragmentary view showing an inner surface of the sleeve shown in FIG. 6, seen from an inside of the sleeve in a radial direction, indicated by an arrow B.

As shown in FIGS. 6 and 7, the splines 24a of the sleeve 24 are formed to have chamfers 24c and 24d at both axial ends, three splines at three positions around a circumstance of the splines 24a of the sleeve 24 are formed to a concave portion 24g having slanted surfaces 24e and 24f formed at both axial ends thereof. The splines at the three positions on the circumference of the sleeve 24 are formed to have a groove 24h extending in the circumference. This groove 24h needs to be formed at three positions, but may be formed entirely along the circumference. The thrust pieces 28 are capable of contacting walls of the concave portions 24g and the grooves 24h.

Figure 8:
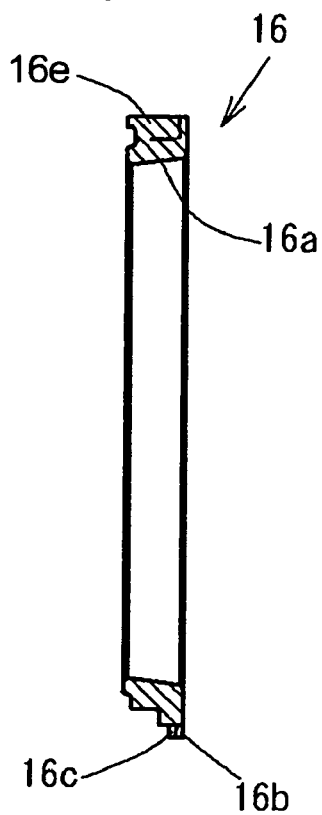
FIG. 8 is a cross-sectional view showing the synchronizer ring used in the select device shown in FIG. 1.
Figure 10:
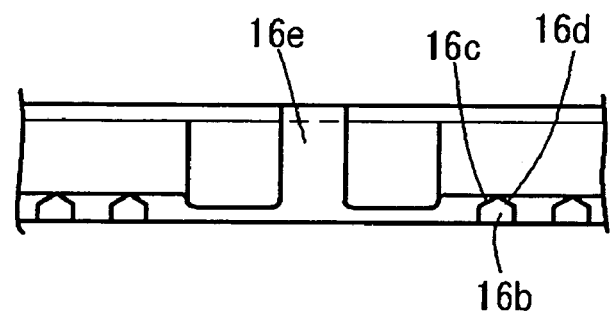
FIG. 10 is an enlarged fragmentary view showing an outer peripheral portion of the synchronizer ring shown in FIGS. 8 and 9.
Figure 9:
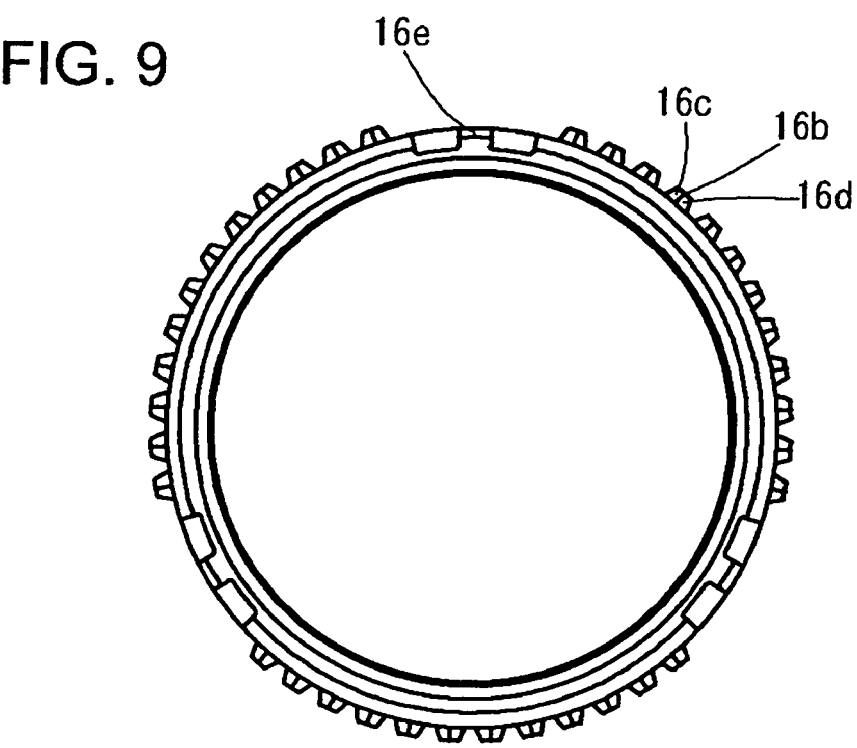
FIG. 9 is a front view of the synchronizer ring shown in FIG. 8.

As shown in FIGS. 8 to 10, the synchronizer ring 16 is formed on its outer peripheral surface with splines 16a, which have chamfers 16c and 16d at the hub 20 side thereof. The hub 16 is further formed on its outer peripheral surface with projections 16e projecting in the axial and radial directions, with which the thrust pieces 28 are capable of contacting.

Figure 11:
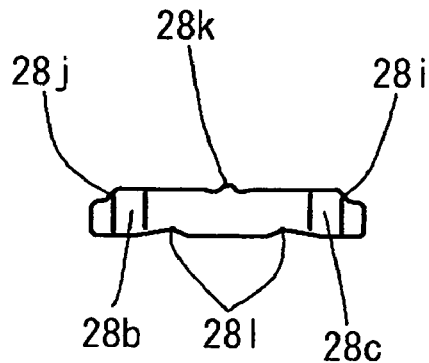
FIG. 11 is a side view showing the thrust piece used in the shift device shown in FIG. 1.
Figure 12:
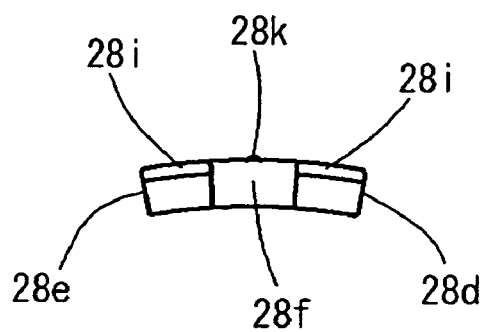
FIG. 12 is a front view showing the thrust piece shown in FIG. 10.
Figure 13:
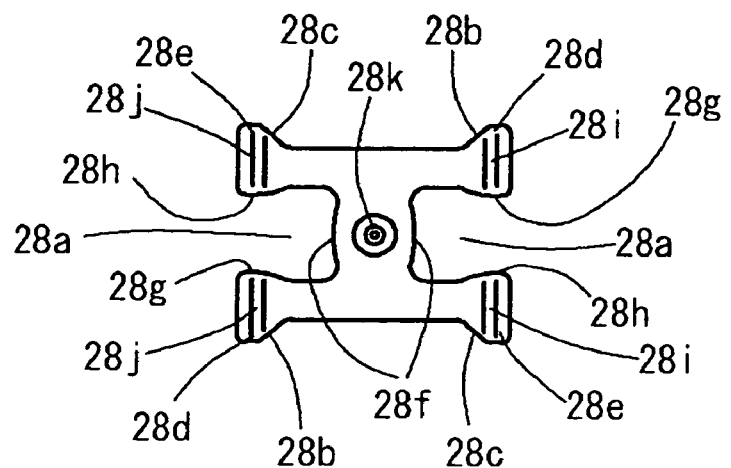
FIG. 13 is a plan view showing the thrust piece shown in FIGS. 10 and 11.

As shown in FIGS. 11 to 13, the thrust piece 28 is formed like a capital letter "H", seen from outside of the hub 20 in the radial direction, having two projecting portions 28d with a slanted surface 28b and two projecting portions 28e with a slanted surface 28c, forming two cut-off portions 28a and 28a at symmetric positions and between the projecting portions 28d and 28e.

The slanted surfaces 28b and 28c are arranged in symmetry to each other with respect to a central projecting portion 28k, and correspond to the slanted surfaces 20h to 20k, and, in a precise sense, they are formed in kind of a circular arc with a rounded edge portion. The cut-off portions 28a have a bottom wall 28f and side walls 28g and 28h, and the walls 28f, 28g and 28h are rounded at their edge portions.

The central projecting portion 28k is inserted in the groove 24h of the sleeve 24 and is capable of contacting with walls of the groove 24h.

As shown in FIG. 11, the thrust piece 28 is further formed at edges of the projecting portions 28d and 28e with slanted surfaces 28j and 28i, which correspond to the slanted surfaces 24e and 24f of the sleeve 24.

As shown in FIG. 11, on an inner surface of the thrust piece 28, two slanted surfaces are provided to form two grooves 28l, with which the spring 18 contacts so as to push the thrust piece 28 outwardly in the radial direction, as shown in FIG. 3. The spring 18 has a ring shape partially cut-off, and its one end portion is bent in the axial direction so as to be inserted in the hole 20l of the hub 20 so that its rotation movement relative to the hub 20 can be prevented.

The thrust pieces 28, in a circular arc like shape as shown in FIG. 12, are arranged in the concave portions 24g and the grooves 24h of the sleeve 24, and are capable of contacting with the walls thereof. They also are inserted in the notches 20f of the hub 20, and capable of contacting with the walls thereof. The walls of the cut-off portions 28a are contactable with the projections 16e of the synchronizer ring 16.

The operation of the shift device of the embodiment will be described with reference to the drawings of FIGS. 3, 14 to 18. Note that the drawings of FIGS. 14 to 17 are development elevations for easy understanding.

Figure 14:
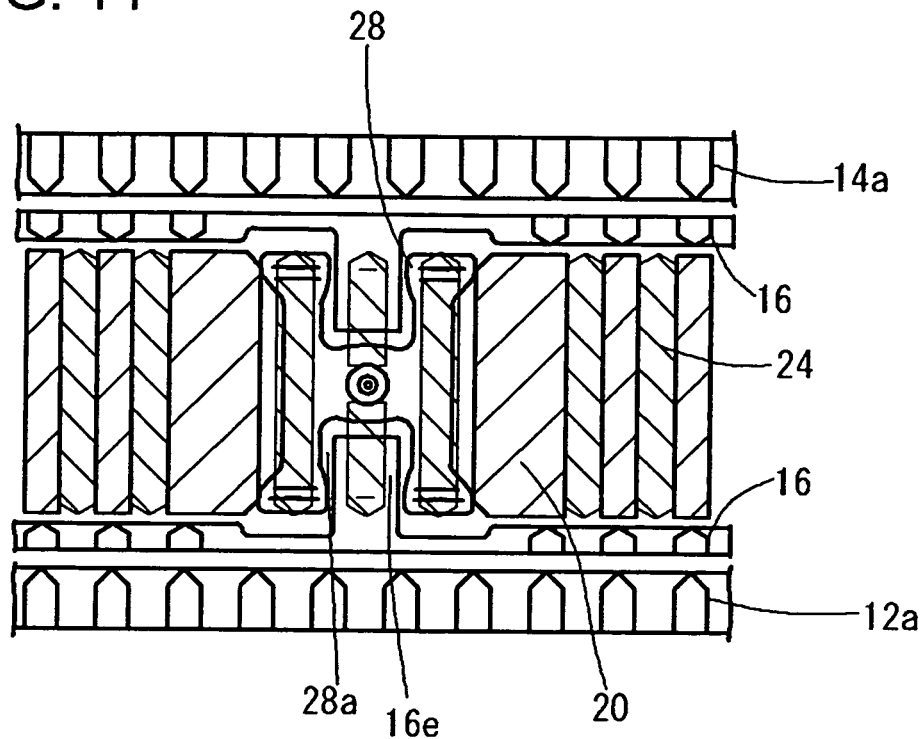
FIG. 14 is a development elevation showing a state where the sleeve is located at a neutral position, taken along the line II-II in FIG. 3 and developed.

At the neutral position, the sleeve 24 is positioned at a position shown in FIGS. 3 and 14, so that its splines 24a engage only with the splines 20e of the hub 20, not with the splines 16b of the synchronizer ring 16. In this position, the thrust pieces 28 are pushed outwardly in the radial direction by two springs 18, so that the thrust pieces 28 are in contact with the walls of concave portions 24g of the sleeve 24, and their central projections 28k are in contact with the walls of the grooves 24 of the sleeve 24.

Figure 15:
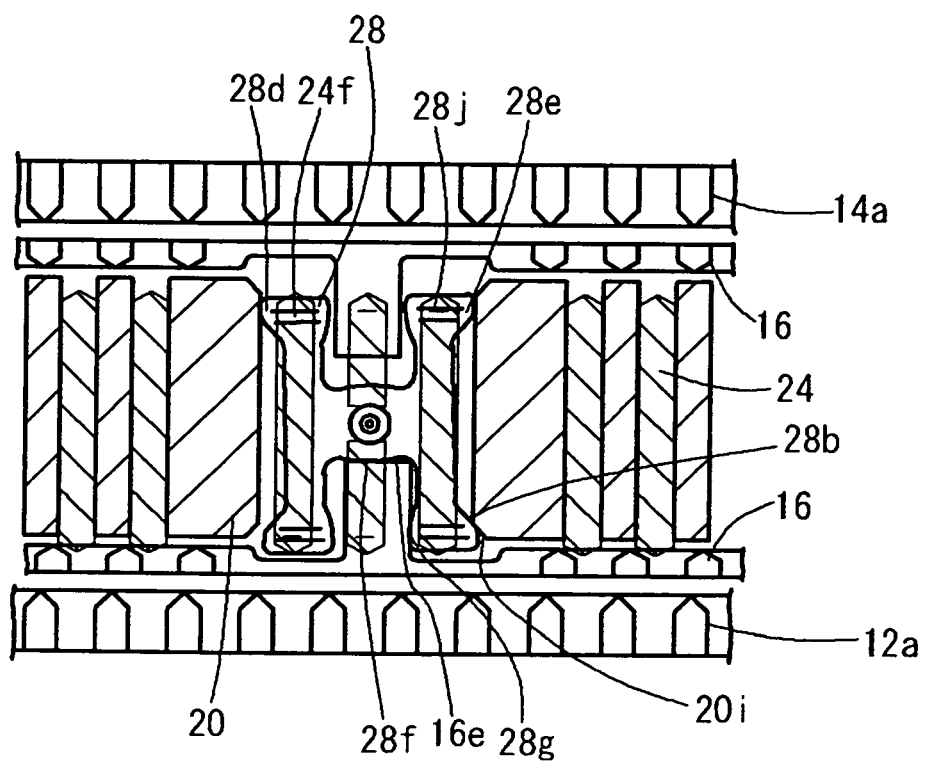
FIG. 15 is a development elevation showing a state where the sleeve pushes the thrust pieces in a circumferential direction to contact their slanted surfaces with slanted surfaces of the hub when the sleeve is moved toward the third gear.

In order to obtain the third speed, the sleeve 24 is moved toward the third gear 12. The sleeve 24 and the thrust pieces 28 move together, so that the bottom walls 28f of the thrust pieces 28 contact with and push the projections 16e of the synchronizer ring 16 as shown in FIG. 15. In this state, the slanted surfaces 24f of the sleeve 24 push the slanted surfaces 28j of the thrust pieces 28, where this pushing force is determined according to a force that spreads the thrust pieces 28 outwardly in the radial direction by the spring 18.

The synchronizer ring 16, being pushed by the thrust pieces 28 toward the third gear 12, contacts and presses its inner conical friction surface 16a onto the outer conical friction surface 12b of the third gear 12 as shown in FIG. 3. In this pressing state, when there is a rotational speed difference between the hub 20 and the third gear 12, friction torque is generated therebetween, dragging the synchronizer ring 16 to rotate in one rotational direction.

This rotation of the synchronizer ring 16 due to the drag force causes its projections 16e to contact with the side walls 28g of the thrust pieces 28 and push them in the circumferential direction. Consequently, the thrust pieces 28 are moved around the fourth-gear 14 side projections 28d and 28e, so that the slanted surfaces 28b contact with the slanted surfaces 20i of the hub 20 as shown in FIG. 15.

As described above, in the shift device of the embodiment, the friction torque generated between the conical friction surfaces 16a and 12a is applied to the slanted surfaces 28b and 20j of the thrust pieces 28 and the hub 20. This friction torque is converted into the thrust, thereby the thrust pieces 28 being pushed toward the third gear 12. This thrust presses the projections 16e of the synchronizer ring 16 through the bottom walls 28f of the thrust pieces 28.

Figure 16:
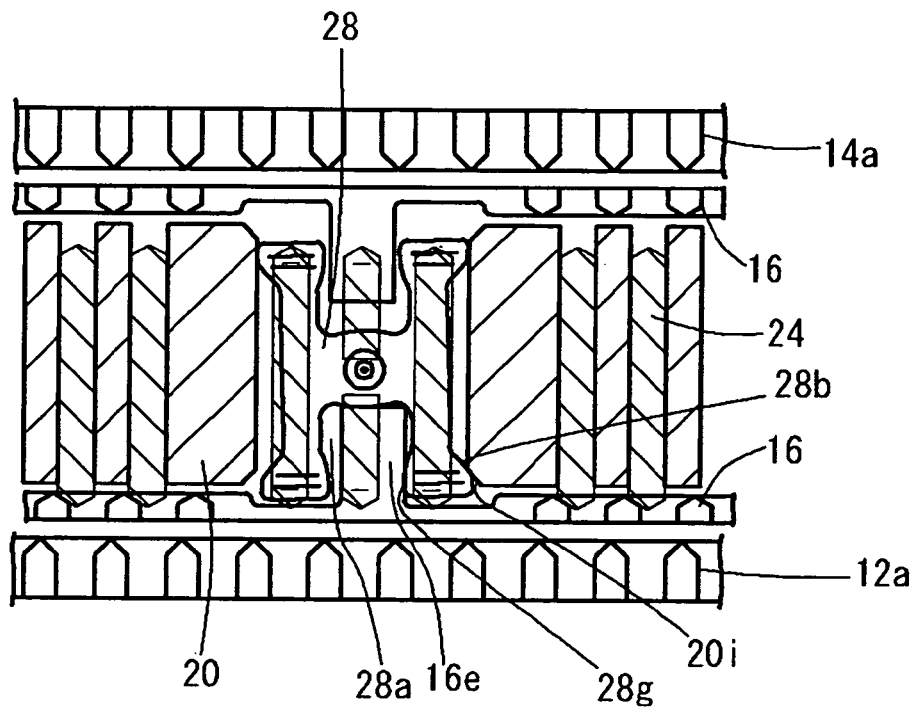
FIG. 16 is a development elevation showing a state where chamfers of the sleeve and chamfers of the synchronizer ring contact each other when the sleeve is further moved toward the third gear.

When the sleeve 24 is further moved toward the third gear 12, the chamfers 24c formed on the splines 24c of the sleeve 24 contact with the chamfers 16c of the synchronizer ring 16 as shown in FIG. 16. In this state, the slanted surfaces 28j, shown in FIG. 7, of the sleeve 24 press the thrust pieces 28 to move inwardly in the radial direction with the spring 18 being retracted.

Force relationships remarkably change before and after the sleeve 24 pushes the synchronizer ring 16 through the chamfers 24c and 16c.

The angles of the chamfers 24c and 16c are set so that the friction torque Tf always becomes larger than the burst-through torque Ts, where the friction torque Tf is generated between the inner and outer conical friction surface 16a and 12a because of the chamfers 24c pressing the chamfers 16c, and the burst-through torque Ts is generated between the chamfers 24c and 16c. This set is similar to that of a normally used Borg-Warner type synchronizer.

Therefore, the sleeve 24 is prevented from further moving toward the third gear 12, pushing the synchronizer ring 16 aside as long as the friction torque Tf is generated between the conical friction surface 16a and 12a, so that the sleeve 24 keeps pushing the synchronizer ring 16 through the chamfers 24c and 16c. In this state, difference torque between the friction torque Tf and the burst-through torque Ts applies to the side walls 28g of the thrust pieces 28 through the projections 16e of the synchronizer ring 16, and eventually applies to the slanted surfaces 20i of the hub 20 through the slanted surfaces 28b of the thrust pieces 28.

After all, the difference torque acting on the slanted surfaces 28b and 20i is converted into the thrust to push the thrust pieces 28 toward the third gear 12. This pushing force acts on the projections 16e of the synchronizer ring 16 through the bottom walls 28f thereof.

Therefore, the friction torque is generated between the conical friction surfaces 16a and 12b by the sum of the pushing force from the sleeve 24 to the synchronizer ring 16 and thrust generated between the slanted surfaces 28b and 20i. This means that the friction torque generated by the synchronizer 2 of the embodiment is larger by torque due to the thrust generated between the slanted surfaces 28b and 20i than that generated in the Borg-Warner type synchronizer, which improves the synchronizing ability.

Figure 17:
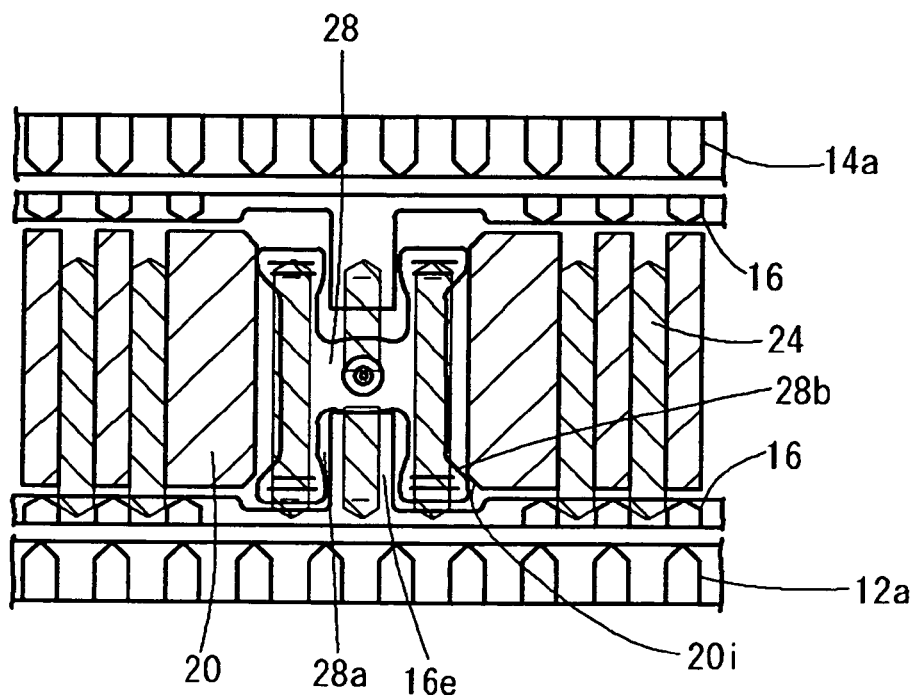
FIG. 17 is a development elevation showing a state where the splines of the sleeve engage with the splines of the third gear when the sleeve is further moved and located at the third speed position, finishing gear shifting to the third speed.

When the rotational difference between the hub 20 and the third gear 12 becomes substantially zero, the friction torque between the conical friction surfaces 16a and 12b is not generated, and accordingly the sleeve 24 further moves toward the third gear 12, with its chamfers 24c moving the chamfers 16c of the synchronizer ring 16 aside as shown in FIG. 17.

Figure 18:
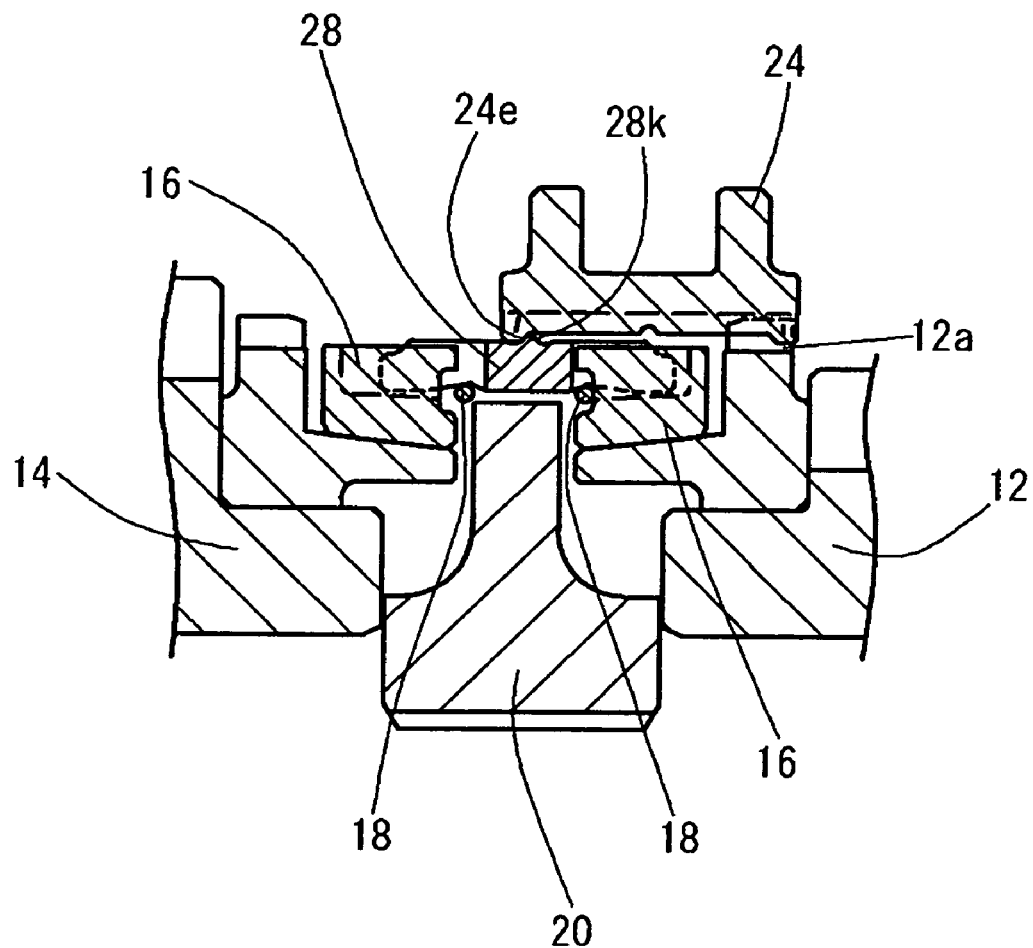
FIG. 18 is a cross-sectional plan view showing the main part of the shift device when the gear shifting is finished.

In this state, the synchronizer ring 16 is pushed back to a rotation position shown in FIG. 14, and the thrust pieces 28 contacted with the projections 16e of the synchronizer ring 16 moves around them. FIG. 17 shows a state where the synchronization ends. After then, the sleeve 24 further moves toward the third gear 12 to engage its splines 24a with the splines 12a of the third gear 12 as shown in FIG. 18. This is an end of the shift operation to the third speed. In this state, the projections 28k of the thrust pieces 28 contact with the slanted surfaces 24e of the sleeve 24, which prevents the thrust pieces 28 from moving toward the fourth gear 14.

A shift operation to the fourth speed is similar to that to the third speed, although movements of the parts are symmetric to those in the shift operation to the third speed.

Incidentally, when the synchronization is not performed, such as when the sleeve 24 is located at the neutral position or when a shift operation is ended, the thrust pieces 28 are located in the notches 20f of the hub 20, and their slanted surfaces 28b and 28c are not in contact with the slanted surfaces 20h to 20k of the hub 20. Therefore, if a torque acts on the thrust pieces 28, no thrust is generated by the torque. A drag friction generated between the synchronizer ring 16 and a speed gear, such as the third gear 12 and the fourth gear 14, does not promote the thrust. This can remove a measure against increase in drag friction, resistance, thereby removing its parts.

The advantages of the shift device 1 with the synchronizer 2 of the embodiment are as follows.

The shift device of the embodiment can amplify pushing force applied to a sleeve, and avoid increase in drag friction torque generated between the sleeve and a hub in a state where no synchronization is performed, with less parts and easy assembly of the parts. This provides lower manufacturing costs.

While there have been particularly shown and described with reference to preferred embodiments thereof, it will be understood that various modifications may be made therein, and it is intended to cover in the appended claims all such modifications as fall within the true spirit and scope of the invention.

In the embodiment, the shift device 1 with the synchronizer 2 is mounted on the input shaft 10, but it may be mounted on an output shaft.

The slanted surfaces 20h to 20k of the hub 20 and the slanted surfaces 28b and 28c of the thrust pieces 28 may be formed in a tapered surface, a helical surface, and others.

The synchronizer ring 16 may have an oil groove on its inner friction surface in order to increase a friction coefficient of the friction surface, and may be made of material for improving synchronizing ability.

The shift device 1 with the synchronizer 2 may be applied to a multi-cone type synchronizer, which has several friction surfaces.

The speed gear employs the third gear 12 and the fourth gear 14 in the embodiment, but may be other speed gear.

The entire contents of Japanese Patent Application No. 2005-227450 filed Aug. 5, 2005 are incorporated herein by reference.

What is claimed is:

1. A shift device with a synchronizer for a transmission comprising:
a shaft for transmitting drive power;
a hub having a boss portion splined with the shaft, a ring portion located outwardly from the boss portion and having splines, and a flange portion connecting the boss portion and the ring portion, each of the ring portion and the flange portion having a plurality of notches, each notch in each of the plurality of notches having four axial edges, each of the four axial edges being provided with a slanted surface for changing rotational force to thrust;
a sleeve provided with splines on an inner peripheral portion thereof, each spline of the sleeve having a concave portion forming a plurality of concave portions, each concave portion having slanted surfaces on a part of a respective spline of the sleeve, the sleeve being supported by and slidable along the splines of the hub;
a pair of speed gears arranged to sandwich the hub and each speed gear having splines engageable with the splines of the sleeve and a friction surface at a hub side;
a pair of synchronizer rings, a first synchronizer ring of the pair of synchronizer rings being arranged between the hub and one of the speed gears, and a second synchronizer ring of the pair of synchronizer rings being arranged between the hub and the other of the speed gears, each of the first and second synchronizer rings having a friction surface, splines and projections, the friction surface of each synchronizer ring being pressable on the friction surface of a respective speed gear, and the splines of each synchronizer ring being formed with chamfers on an outer circumference thereof; and
thrust pieces respectively inserted in the concave portions of the sleeve and movable in the notches of the hub in an axial direction, wherein
the thrust pieces have slanted surfaces on an outer circumferential surface thereof for contacting the slanted surfaces of the sleeve so that the sleeve can push the thrust pieces in the axial direction, the thrust pieces being pushed outwardly in a radial direction, so that the sleeve moves together with the thrust pieces in the axial direction and then moves relative to the thrust pieces in the axial direction, pressing the thrust pieces inwardly in the radial direction when the sleeve is shifted from a neutral position toward one of the speed gears to be engaged, wherein the thrust pieces are configured to contact the projections of the synchronizer rings in a rotational direction, so that the thrust pieces push the projections of the synchronizer rings in the axial direction, wherein each thrust piece of the thrust pieces has four edges and are formed with projecting portions at the four edges thereof, seen from an outside of the hub in the radial direction, the projecting portions of the thrust pieces being formed with slanted surfaces corresponding to the slanted surfaces of the hub so that the slanted surfaces of the thrust pieces are apart from the slanted surfaces of the hub when the sleeve is located at the neutral position, wherein the slanted surfaces of the thrust pieces and the hub are configured to contact each other by the thrust pieces moving when the sleeve is shifted from the neutral position to one of the speed gears in the pair of speed gears to be engaged, and a difference torque between the friction surfaces between the respective synchronizer and one of the speed gears in the pair of speed gears to be engaged is generated, and wherein the thrust pieces are moved, such that the slanted surfaces of the thrust pieces are apart from the slanted surfaces of the hub, by the projections of the respective synchronizer ring that is pushed back when the difference torque becomes zero.

2. The shift device according to claim 1, wherein
the thrust pieces have a capital letter "H" shape, seen from an outside of the hub in the radial direction, and have cut-off portions in the letter "H" configured to contact the projections of each of the synchronizer rings.

3. The shift device according to claim 2, wherein
the thrust pieces are configured to be pushed outwardly in the radial direction by a spring.

4. The shift device according to claim 3, wherein
the thrust pieces have projections contactable with walls of circumferential grooves in concave portions of the sleeve.

5. The shift device according to claim 2, wherein
the projections of each of the synchronizer rings are configured to drive the thrust pieces so that the thrust pieces move in the axial direction when the rotational difference between the hub and the one of the speed gears to be engaged with the hub becomes zero at an end of a shift operation of the shift device.

6. The shift device according to claim 2, wherein
the thrust pieces have projections contactable with walls of circumferential grooves in concave portions of the sleeve.

7. The shift device according to claim 2, wherein
the slanted surfaces of the hub and the thrust pieces are formed in one of a circular arc with a rounded edge portion, a tapered surface and a helical surface.

8. The shift device according to claim 1, wherein
the thrust pieces are configured to be pushed outwardly in the radial direction by a spring.

9. The shift device according to claim 8, wherein
the thrust pieces have projections contactable with walls of circumferential grooves in concave portions of the sleeve.

10. The shift device according to claim 8, wherein
the projections of each of the synchronizer rings are configured to drive the thrust pieces so that the thrust pieces move in the axial direction when the rotational difference between the hub and the one of the speed gears to be engaged with the hub becomes zero at an end of a shift operation of the shift device.

11. The shift device according to claim 8, wherein
the thrust pieces have projections contactable with walls of circumferential grooves in concave portions of the sleeve.

12. The shift device according to claim 8, wherein
the slanted surfaces of the hub and the thrust pieces are formed in one of a circular arc with a rounded edge portion, a tapered surface and a helical surface.

13. The shift device according to claim 1, wherein
the thrust pieces have projections contactable with walls of circumferential grooves in concave portions of the sleeve.

14. The shift device according to claim 13, wherein
the projections of each of the synchronizer rings are configured to drive the thrust pieces so that the thrust pieces move in the axial direction when the rotational difference between the hub and the one of the speed gears to be engaged with the hub becomes zero at an end of a shift operation of the shift device.

15. The shift device according to claim 13, wherein
the slanted surfaces of the hub and the thrust pieces are formed in one of a circular arc with a rounded edge portion, a tapered surface and a helical surface.

16. The shift device according to claim 1, wherein
the slanted surfaces of the hub and the thrust pieces are formed in one of a circular arc with a rounded edge portion, a tapered surface and a helical surface.

17. The shift device according to claim 16, wherein
the projections of each of the synchronizer rings are configured to drive the thrust pieces so that the thrust pieces move in the axial direction when the rotational difference between the hub and the one of the speed gears to be engaged with the hub becomes zero at an end of a shift operation of the shift device.

18. The shift device according to claim 1, wherein
the thrust pieces include three thrust pieces.

19. The shift device according to claim 1, wherein
the projections of each of the synchronizer rings are configured to drive the thrust pieces so that the thrust pieces move in the axial direction when the rotational difference between the hub and the one of the speed gears to be engaged with the hub becomes zero at an end of a shift operation of the shift device.

* * * * *